US012590823B2

(12) United States Patent     (10) Patent No.:   US 12,590,823 B2

Kursawe                   (45) Date of Patent:    Mar. 31, 2026

(54) SENSOR MODULE INCLUDING AN ENERGY SAVING OPERATION MODE

(71) Applicant: Robert Bosch GmbH, Stuttgart (DE)

(72) Inventor: Frank Kursawe, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 196 days.

(21) Appl. No.: 18/696,273

(22) PCT Filed: Jan. 31, 2023

(86) PCT No.: PCT/EP2023/052281

§ 371 (c)(1),
(2) Date: Mar. 27, 2024

(87) PCT Pub. No.: WO2023/148151

PCT Pub. Date: Aug. 10, 2023

(65) Prior Publication Data

US 2024/0426643 A1     Dec. 26, 2024

(30) Foreign Application Priority Data

Feb. 2, 2022    (DE) ..................... 10 2022 201 111.2

(51) Int. Cl.
*G01D 21/00*       (2006.01)
*B60T 7/04*        (2006.01)
            (Continued)

(52) U.S. Cl.
CPC .............. *G01D 21/00* (2013.01); *B60T 7/042* (2013.01); *F16D 66/00* (2013.01); *G01D 21/02* (2013.01); *F16D 2066/003* (2013.01)

(58) Field of Classification Search
CPC ........ G01D 21/00; G01D 21/02; B60T 7/042; F16D 66/00; F16D 2066/003
See application file for complete search history.

(56) References Cited

U.S. PATENT DOCUMENTS

| | | | | |
|---|---|---|---|---|
| 4,842,113 A | * | 6/1989 | Lutz ...................... | B60W 10/06 |
| | | | | 477/73 |
| 5,954,407 A | * | 9/1999 | Schramm .............. | B60T 8/3255 |
| | | | | 303/155 |

(Continued)

FOREIGN PATENT DOCUMENTS

| | | |
|---|---|---|
| DE | 10054745 A1 | 12/2001 |
| DE | 102009008483 A1 | 8/2010 |

(Continued)

OTHER PUBLICATIONS

International Search Report for PCT/EP2023/052281, Issued Apr. 5, 2023.

*Primary Examiner* — Yusef A Ahmed

(74) *Attorney, Agent, or Firm* — NORTON ROSE FULBRIGHT US LLP

(57)            ABSTRACT

A sensor module. The sensor module includes at least two sensor units; a control device configured to adjust an electrical supply voltage for the sensor units; and a sensor signal output. The sensor units can be electrically connected to or electrically disconnected from the control device and are electrically connected to the sensor signal output. A first sensor unit, during a normal operation, provides a first output signal through the sensor signal output, and a second sensor unit, during an energy-saving operation, provides a second output signal through the sensor signal output. A decision unit is associated with the control device, and electrically connects or disconnects the first or second sensor unit to the control device depending on the adjusted electrical supply voltage. The control device is configured to, during the energy-saving operation, change the supply voltage when the output signal reaches a defined threshold value.

10 Claims, 2 Drawing Sheets

(51) Int. Cl.
    *F16D 66/00*      (2006.01)
    *G01D 21/02*     (2006.01)

(56)           References Cited

U.S. PATENT DOCUMENTS

| | | | | |
|---|---|---|---|---|
| 6,209,966 | B1 * | 4/2001 | Mies | B60T 8/326 |
| | | | | 303/3 |
| 7,560,918 | B2 * | 7/2009 | Gschossmann | G01P 3/481 |
| | | | | 324/160 |
| 9,837,853 | B2 * | 12/2017 | Chen | H02J 9/00 |
| 10,809,151 | B2 * | 10/2020 | Lysen | G01M 13/00 |
| 12,115,903 | B2 * | 10/2024 | Kim | B60Q 1/444 |
| 2004/0070269 | A1 * | 4/2004 | Anwar | B60T 13/586 |
| | | | | 303/152 |
| 2007/0046102 | A1 * | 3/2007 | Reithofer | G01D 5/145 |
| | | | | 307/10.1 |
| 2009/0133395 | A1 * | 5/2009 | Hilberer | B60T 17/02 |
| | | | | 60/329 |
| 2019/0036322 | A1 * | 1/2019 | Kralik | H04B 3/54 |
| 2019/0375384 | A1 * | 12/2019 | Cho | B60T 8/885 |
| 2020/0025841 | A1 * | 1/2020 | Philippart | B60W 20/10 |
| 2020/0241085 | A1 * | 7/2020 | Peev | G01D 3/08 |
| 2020/0262411 | A1 * | 8/2020 | Schlitzkus | B60T 13/66 |
| 2021/0114567 | A1 * | 4/2021 | Rebholz-Goldmann | |
| | | | | G01R 1/206 |
| 2021/0394723 | A1 * | 12/2021 | Decker, Jr. | B60T 7/20 |
| 2022/0158478 | A1 * | 5/2022 | Neveri | B60R 16/03 |

FOREIGN PATENT DOCUMENTS

| | | | |
|---|---|---|---|
| DE | 102012017780 | B4 | 5/2014 |
| DE | 102019202011 | A1 | 8/2020 |
| EP | 3531081 | A1 | 8/2019 |

* cited by examiner

S1 — energy saving mode

S2 — actuate actuating element detect second output signal reaches defined threshold value

S3

S4 — detect change in supply voltage sense further or ongoing displacement of actuating element

S5

S6 — evaluate first output signal

S7 — control brake booster detect request to switch brake system back to energy-saving mode

S8

S9 — reduce supply voltage

SENSOR MODULE INCLUDING AN ENERGY SAVING OPERATION MODE

FIELD

The present invention relates to a sensor module comprising at least two sensor units; a control device, which is designed to adjust an electrical supply voltage for the sensor units; and at least one sensor signal output, wherein the at least two sensor units can be electrically connected to or electrically disconnected from the control device and are electrically connected to the sensor signal output, wherein a first of the sensor units, during a normal operation of the sensor module, provides a first output signal through the sensor signal output and a second of the sensor units, during an energy-saving operation of the sensor module, provides a second output signal through the sensor signal output, and wherein a decision unit is associated with the control device, which decision unit is designed to electrically connect either the first sensor unit or the second sensor unit to the control device.

The present invention furthermore relates to a brake system comprising such a sensor module.

In addition, the present invention relates to a method for operating the sensor module.

BACKGROUND INFORMATION

Sensor modules of the type mentioned at the outset are described in principle in the related art. For example, German Patent No. DE 10 2012 017 780 B4 describes a sensor module designed as a microcontroller unit for a motor vehicle, which sensor module comprises at least two sensor units in the form of microcontrollers associated with sensors of the motor vehicle or designed to operate these sensors. A first of the sensor units is designed as a main sensor unit active during a normal operation, which main sensor unit processes various input variables sensed by the sensors and generates at least a first output signal on the basis of the processing. A second of the sensor units is designed as a standby microcontroller active during an energy-saving operation, which standby microcontroller generates at least a second output signal. The first and the second output signal are provided via a sensor signal output of the sensor module that is shared by the two sensor units.

The sensor module is associated with a voltage source connected to a control device of the sensor module that is designed as a current regulation device. As a result, by interposing the control device, a supply voltage provided by the voltage source can be provided for operating the sensor module. The control device is designed to electrically connect or electrically disconnect the sensor units to or from the voltage source, wherein, as a rule, only one of the sensor units is operated at a time. In this respect, the control device also acts as a decision unit, which is designed to electrically connect either the first or the second sensor unit to the voltage source.

SUMMARY

A sensor module including features of the present may have the advantage that it has a simplified technical structure. According to an example embodiment of the present invention, it is provided that the decision unit is designed to electrically connect or disconnect the first sensor unit or the second sensor unit to or from the control unit depending on the adjusted electrical supply voltage, and that the control device is designed, at least during the energy-saving operation, to change the supply voltage when the output signal provided through the sensor signal output reaches a defined threshold value. The control device is in particular designed to change the supply voltage when the output signal exceeds or falls below the threshold value. The selection as to which of the two sensor units is operated thus takes place depending on the adjusted electrical supply voltage so that the sensor module is designed to control the activity of the sensor units by adjusting its supply voltage in a technically comparatively easy-to-implement manner. In this respect, no additional communication interface and no additional signal are required to activate or deactivate the sensor units so that the sensor module, in particular the decision unit and the sensor units, can in particular be designed to be comparatively straightforward in terms of communication technology. In addition, the change provided according to the present invention in the supply voltage ensures a particularly energy-saving operation of the sensor module.

According to a preferred development of the present invention, it is provided that the control device comprises at least one circuit unit for detecting the output signal provided through the sensor signal output. As a result, the output signal can be detected and processed by the control device itself so that no additional and in particular complex evaluation unit is required for this purpose. This further simplifies the structure of the sensor module. In particular, the circuit unit comprises a pull-up resistor.

In particular, according to an example embodiment of the present invention, the decision unit comprises a Zener diode (Z-diode), a comparator, or a circuit with an operational amplifier. This allows for a particularly simple technical design of the decision unit.

It is preferably provided that the sensor units are respectively associated with a switch, which can be controlled by the decision unit, is in particular designed as a transistor and by means of which the respective sensor unit can be electrically connected to the control device for supplying the supply voltage to the sensor unit or can be electrically disconnected therefrom. Advantageously, this makes it technically particularly simple to implement the electrical connection or disconnection of the sensor units from the control device.

Preferably, according to an example embodiment of the present invention, the sensor units respectively comprise an open collector output or open drain output, by means of which the respective sensor unit is electrically connected to the sensor signal output. This results in the advantage that a signal line associated with the respectively non-active sensor unit and, in particular, the sensor signal output shared by the sensor units are not loaded by the inactive sensor unit. Both sensor units are furthermore preferably connected to the sensor signal output so that no additional changeover switch, in particular multiplexer, is required. Alternatively, at least one of the sensor units comprises a different output that can be switched off, in particular a tri-state output.

According to a preferred development of the present invention, the second sensor unit is designed as a standby sensor, in particular a Hall switch. The structure of the sensor module is thereby further simplified.

A brake system of the present invention includes the sensor module is designed according to the present invention as described above. This results in the advantages already mentioned in this respect.

In a method for operating a sensor module with features of the present invention, depending on the adjusted electrical supply voltage, either the first sensor unit or the second sensor unit is electrically connected to or electrically disconnected from the control device, and that, at least during the energy-saving operation, the supply voltage is changed when the output signal provided through the sensor signal output reaches a defined threshold value. The supply voltage is in particular changed when the output signal exceeds or falls below the threshold value. Preferably, the output signal provided by the sensor signal output is detected by a circuit unit of the control device in order to change the supply voltage. In particular, the respective sensor unit is electrically connected to the control device by means of a switch, in particular a transistor, which is associated with the sensor unit and can be controlled by the decision unit, for supplying the sensor unit with the supply voltage or is electrically disconnected therefrom. This results in the aforementioned advantages in each case.

In the method for operating a brake system, in particular the brake system described above, with features of the present invention, the sensor module is operated according to the above-described method of the present invention for operating a sensor module. This results in the advantages already mentioned in this respect.

Preferred features and combinations of features result in particular from what was described above and what is disclosed herein. The present invention is explained in more detail below with reference to the figures.

DETAILED DESCRIPTION OF EXAMPLE EMBODIMENTS

Figure 1:
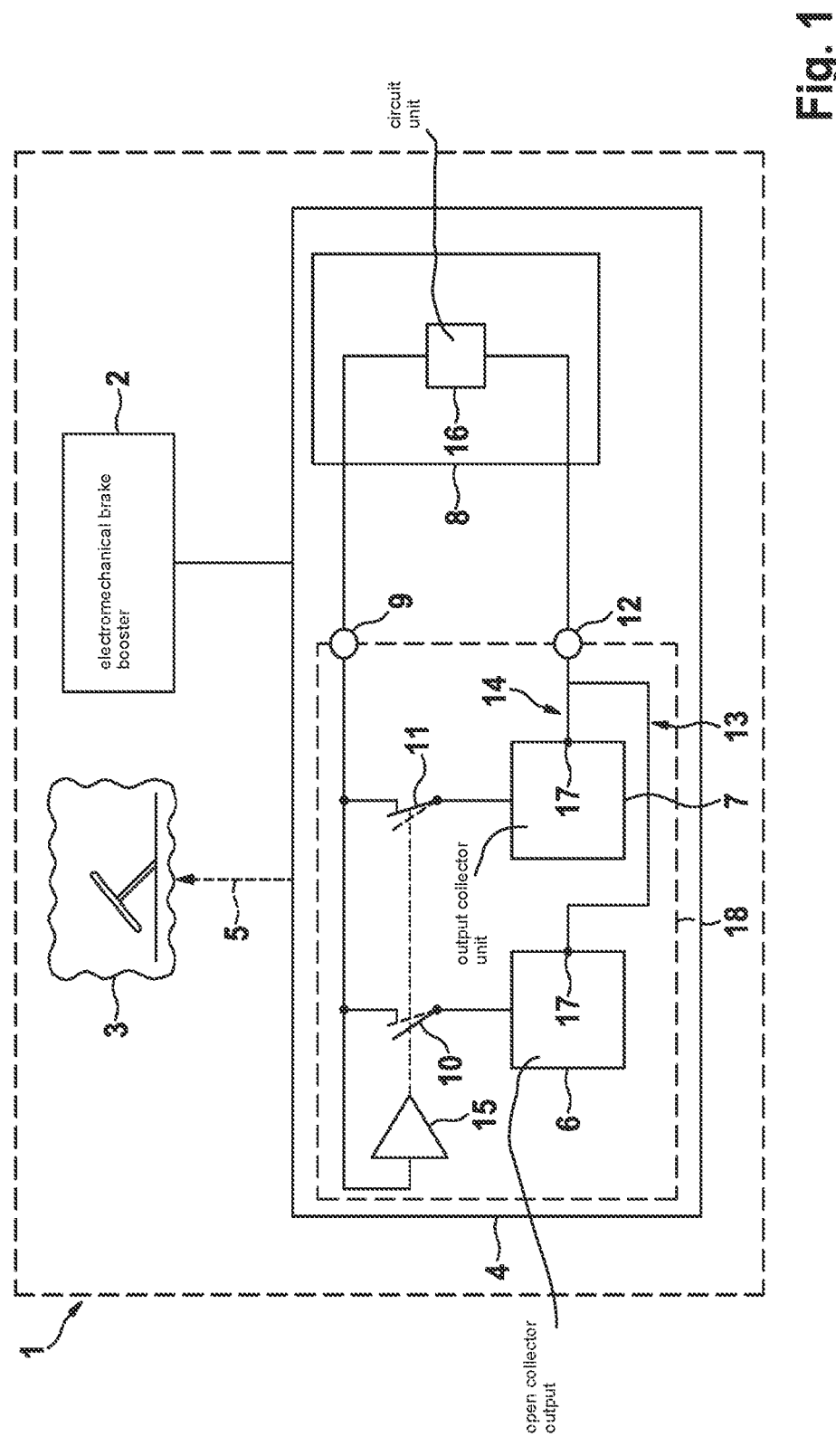
FIG. 1 shows a highly simplified schematic representation of an advantageous brake system including an advantageous sensor module according to an example embodiment of the present invention.

FIG. 1 shows, in a highly simplified schematic representation, an advantageous brake device 1 for a motor vehicle (not shown in more detail here). The brake system 1 comprises an electromechanical brake booster 2 shown in FIG. 1 only by way of example, an actuating element 3 shown symbolically here and designed as a brake pedal of the motor vehicle, and a sensor module 4. The sensor module 4 serves to control the brake booster 2 on the basis of a displacement of the actuating element 3 that is caused by a user of the motor vehicle, in order to generate a braking force for decelerating the motor vehicle. For this purpose, the sensor module 4 is associated with the actuating element 3, as shown in FIG. 1 by way of an example using a dashed arrow 5, and is designed to control the brake booster 2 depending on the displacement of the actuating element 3.

According to the present exemplary embodiment, the sensor module 4 comprises two sensor units 6, 7, which in the present case serve to sense the displacement of the actuating element 3. The sensor module 4 furthermore comprises a control device 8, which is designed to adjust an electrical supply voltage, which is provided according to the present exemplary embodiment by a voltage source not shown in FIG. 1, for the sensor units 6, 7. For supplying the supply voltage to the sensor units 6, 7, the latter are electrically connected to the control device 8 using a supply terminal 9 and two switches 10, 11, which are respectively associated with one of the sensor units 6, 7, or can be electrically disconnected therefrom. The sensor module 4 furthermore comprises a sensor signal output 12 shared by the sensor units 6, 7, to which sensor signal output the two sensor units 6, 7 are always electrically connected. The sensor signal output 12 in turn is electrically connected to the control device 8 in order to provide output signals 13, 14, generated by the sensor units 6, 7, to the control device 8 for further processing, as explained in more detail below.

According to the present exemplary embodiment, a first sensor unit 6 is designed as an operation sensor active during a normal operation of the sensor module 4, which operation sensor provides a first output signal 13 via the sensor signal output 12 during normal operation. According to the present exemplary embodiment, a second sensor unit 7 is designed as a standby sensor, in particular a Hall switch, which provides a second output signal 14, which is different from the first output signal 13, via the sensor signal output 12 during an energy-saving operation of the sensor module 4, in which the first sensor unit 6 is inactive. In this respect, the sensor signal output 12 advantageously serves both to provide the first output signal 13 and to provide the second output signal 14. However, in order to avoid superposition and thus impairment of the output signals 13, 14, it is necessary that only one of the sensor units 6, 7 is operated, or at least generates the respective output signal, at a time. In this respect, one of the switches 10, 11 is always closed, while the other switch 11, 10 is open, so that only one of the sensor units is supplied with the supply voltage, and thus active, at a time. In order to ensure or control this, the sensor module 4 furthermore comprises a decision unit 15, in particular comprising a Zener diode, a comparator, or a circuit with an operational amplifier, and is designed to electrically connect or electrically disconnect either the first sensor unit 6 or the second sensor unit 7 to or from the control device 8 by controlling the switches 10, 11.

Advantageously, it is provided that the selection as to which of the two sensor units 6, 7 is to be electrically connected to the control device 8 and is to be operated is controlled by an adjustment of the supply voltage that is brought about by the control device 8. For this purpose, the decision unit 15 is designed to electrically connect the first sensor unit 6 or the second sensor unit 7 to the control device 8 depending on the adjusted electrical supply voltage. In this respect, the decision unit 15 is designed to detect a change in the supply voltage and, based thereon, to decide which of the two sensor units 6, 7 is to be electrically connected to the control device 8, or the supply voltage, and thereby operated. The corresponding adjustment or change in the supply voltage in turn is carried out by the control device 8 depending on the output signal 13, 14 provided through the signal output 12, viz., in particular when the output signal 13, 14 currently provided through the sensor signal output 12 reaches a defined threshold value. In order to detect or evaluate the corresponding output signal 13, 14, the control device 8 comprises at least one circuit unit 16, in particular with a pull-up resistor. The control device 8 is thus able to detect that the defined threshold value is reached and, based thereon, to adjust the supply voltage.

As already mentioned above, the sensor signal output 12 is used both to provide the first output signal 13 and to provide the second output signal 14. According to the present exemplary embodiment, in order not to unnecessarily load corresponding signal lines associated with the sensor signal output 12, it is provided that the sensor units 6, 7 respectively comprise an open drain output or open collector output 17, by means of which the sensor units 6, 7 are connected to the sensor signal output 12. The supply voltage is changed when a voltage level of the open drain output or open collector output 17 as the output signal 13, 14 falls below the threshold value. According to the present exemplary embodiment, the control device 8, the sensor units 6, 7, and the decision unit 15 are formed discretely, i.e., as separate elements, and connected to one another by means of cables or lines. Optionally, however, at least the decision unit 15 and the sensor units 6, 7 may be arranged on a common printed circuit board 18, as shown by way of example in FIG. 1 by dashed lines. In particular, the sensor units 6, 7 and the decision unit 15 are formed on a common semiconductor chip.

Figure 2:
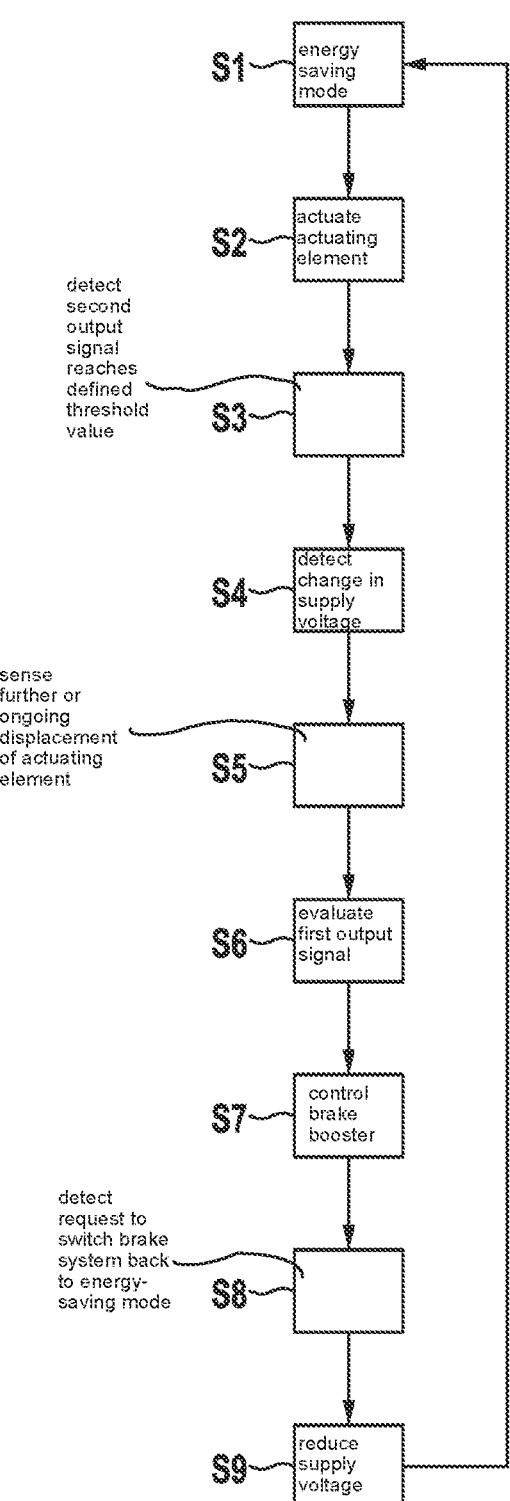
FIG. 2 shows a schematic flowchart of an advantageous method for operating the brake system or the sensor module according to an example embodiment of the present invention.

An advantageous method for operating the brake system 1 or the sensor module 4 thereof is explained below with reference to the schematic flowchart shown in FIG. 2.

The method begins in a first step S1, in which the brake system 1 or the sensor module 4 is in the energy-saving mode.

Therefore, at this time, the second sensor unit 7 is active and the first sensor unit 6 is inactive, and the second switch 11 is closed and the first switch 10 is open, as shown in FIG. 1. Accordingly, in step S1, the second sensor unit 7 is electrically connected to the control device 8 and is operated by means of the supply voltage. In a second step S2, the actuating element 3 is now actuated by the user of the motor vehicle. This is sensed by the second sensor unit 7 and, thereupon, the second output signal 14 is provided through the sensor signal output 12 to the control device 8. In a subsequent step S3, the circuit unit 16 detects that the second output signal 14 reaches the defined threshold value, whereupon the control device 8 changes, preferably increases, the supply voltage. As a result, a changed, in particular increased, supply voltage is provided via the supply terminal 9. In a next step S4, the change in the supply voltage is detected by the decision unit 15 and, thereupon, the second switch 11 is opened and the first switch 10 is closed in order to deactivate the second sensor unit 7 and to activate the first sensor unit 6. In a further step S5, the first sensor unit 6 then senses the further or ongoing displacement of the actuating element 3 and consequently provides the first output signal 13 via the sensor signal output 12 to the control device 8. The first output signal 13 comprises a protocol for operating the brake booster 2 and is evaluated in a further step S6 by the control device 8. On the basis of this evaluation, in a next step S7, the brake booster 2 is controlled by the control device 8 or the sensor module 4 in order to realize a braking force based on the user's deceleration request expressed by actuating the actuating element 3. If a request to switch the brake system 1 back to the energy-saving mode is subsequently detected in a further step S8, for example when the user has parked or left the motor vehicle, the first output signal 13 is changed such that it reaches a defined threshold value so that the control device 8 detects that the supply voltage is to be changed again. In a final step S9, the supply voltage is then changed again, in particular reduced, by the control device 8 so that the decision unit 15 deactivates the first sensor unit 6 and reactivates the second sensor unit 7 by correspondingly controlling the two switches 10, 11. The method subsequently starts again with step S1.

The invention claimed is:

1. A sensor module, comprising:
  at least two sensor units;
  a control device configured to adjust an electrical supply voltage for the at least two sensor units; and
  a sensor signal output,
  wherein:

the at least two sensor units are configured to be electrically connected to or electrically disconnected from the control device and are electrically connected to the sensor signal output,
    a first sensor unit of the at least two sensor units, during a normal operation of the sensor module, provides a first output signal through the sensor signal output,
    a second sensor unit of the at least two sensor units, during an energy-saving operation of the sensor module, provides a second output signal, which is different from the first output signal, through the sensor signal output,
    a decision unit is connected to the control device, the decision unit being configured to electrically connect or electrically disconnect the first sensor unit or the second sensor unit to or from the control device based on the adjusted electrical supply voltage,
    the control device is configured, at least during the energy-saving operation, to change the electrical supply voltage when the first output signal or the second output signal provided through the sensor signal output reaches a defined threshold value,
    each of the first sensor unit and the second sensor unit is connected to a respective switch, each of the respective switches being configured to be controlled by the decision unit, and
    each respective sensor unit of the first sensor unit and the second sensor unit is configured to be, using the respective switch of the respective sensor unit, electrically connected to the control device for supplying the electrical supply voltage to the respective sensor unit or electrically disconnected from the electrical supply voltage.

2. The sensor module according to claim 1, wherein the control device includes at least one circuit unit including a pull-up resistor, for detecting the first output signal or the second output signal provided through the sensor signal output.

3. The sensor module according to claim 1, wherein the decision unit includes one of a Zener diode, a comparator, or a circuit with an operational amplifier.

4. The sensor module according to claim 1, wherein each of the respective switches includes a transistor.

5. The sensor module according to claim 1, wherein the at least two sensor units respectively include an open collector output, an open drain output, or a tri-state output.

6. The sensor module according to claim 1, wherein the second sensor unit is a standby sensor including a Hall switch.

7. A brake system, comprising:
  an electromechanical or electrohydraulic brake booster;
  an actuating element including a brake pedal configured to be displaced by a user; and
  a sensor module coupled to the actuating element, the sensor module being configured to control the electromechanical or electrohydraulic brake booster based on a displacement of the actuating element;
  wherein the sensor module includes:
    at least two sensor units,
    a control device configured to adjust an electrical supply voltage for the at least two sensor units, and
    a sensor signal output,
    wherein:
      the at least two sensor units are configured to be electrically connected to or electrically disconnected from the control device and are electrically connected to the sensor signal output, a first sensor unit of the at least two sensor units, during a normal operation of the sensor module, provides a first output signal through the sensor signal output, a second sensor unit of the at least two sensor units, during an energy-saving operation of the sensor module, provides a second output signal, which is different from the first output signal, through the sensor signal output, a decision unit is connected to the control device, the decision unit being configured to electrically connect or electrically disconnect the first sensor unit or the second sensor unit to or from the control device based on the adjusted electrical supply voltage, the control device is configured, at least during the energy-saving operation, to change the electrical supply voltage when the first output signal or the second output signal provided through the sensor signal output reaches a defined threshold value, each of the first sensor unit and the second sensor unit is connected to a respective switch, each of the respective switches being configured to be controlled by the decision unit, and each respective sensor unit of the first sensor unit and the second sensor unit is configured to be, using the respective switch of the respective sensor unit, electrically connected to the control device for supplying the electrical supply voltage to the respective sensor unit or electrically disconnected from the electrical supply voltage.

8. A method for operating a sensor module including at least two sensor units, a control device configured to adjust an electrical supply voltage for the at least two sensor units, and a sensor signal output, wherein:

the at least two sensor units are configured to be electrically connected to or electrically disconnected from the control device and are electrically connected to the sensor signal output, a first sensor unit of the at least two sensor units, during a normal operation of the sensor module, provides a first output signal through the sensor signal output, a second sensor unit of the at least two sensor units, during an energy-saving operation of the sensor module, provides a second output signal, which is different from the first output signal, through the sensor signal output, a decision unit is connected to the control device, the decision unit being configured to electrically connect either the first sensor unit or the second sensor unit to the control device, each of the first sensor unit and the second sensor unit is connected to a respective switch, each of the respective switches being configured to be controlled by the decision unit, and each respective sensor unit of the first sensor unit and the second sensor unit is configured to be, using the respective switch of the respective sensor unit, electrically connected to the control device for supplying the electrical supply voltage to the respective sensor unit or electrically disconnected from the electrical supply voltage, the method comprising the following steps:

electrically connecting or electrically disconnecting either the first sensor unit or the second sensor unit to or from the control device, based on the adjusted electrical supply voltage; and changing the electrical supply voltage, at least during the energy-saving operation, when the first output signal or the second output signal provided through the sensor signal output reaches a defined threshold value.

9. The method according to claim 8, wherein each of the respective switches includes a transistor.

10. A method for operating a brake system, the brake system including an electromechanical or electrohydraulic brake booster, an actuating element including a brake pedal configured to be displaced by a user, and a sensor module coupled to the actuating element, wherein the electromechanical or electrohydraulic brake booster is controlled by the sensor module based on a displacement of the actuating element, wherein the sensor module includes at least two sensor units, a control device configured to adjust an electrical supply voltage for the at least two sensor units, and a sensor signal output, and wherein:

the at least two sensor units are configured to be electrically connected to or electrically disconnected from the control device and are electrically connected to the sensor signal output, a first sensor unit of the at least two sensor units, during a normal operation of the sensor module, provides a first output signal through the sensor signal output, a second sensor unit of the at least two sensor units, during an energy-saving operation of the sensor module, provides a second output signal, which is different from the first output signal, through the sensor signal output, a decision unit is connected to the control device, the decision unit being configured to electrically connect either the first sensor unit or the second sensor unit to the control device, each of the first sensor unit and the second sensor unit is connected to a respective switch, each of the respective switches being configured to be controlled by the decision unit, and each respective sensor unit of the first sensor unit and the second sensor unit is configured to be, using the respective switch of the respective sensor unit, electrically connected to the control device for supplying the electrical supply voltage to the respective sensor unit or electrically disconnected from the electrical supply voltage, the method comprising the following steps:

electrically connecting or electrically disconnecting either the first sensor unit or the second sensor unit to or from the control device, based on the adjusted electrical supply voltage; and changing the electrical supply voltage, at least during the energy-saving operation, when the first output signal or the second output signal provided through the sensor signal output reaches a defined threshold value.

* * * * *